TAPE HANDLING METHOD AND APPARATUS

Filed Jan. 3, 1967 Sheet 1 of 2

INVENTOR
DELMAR RONALD JOHNSON

BY Anderson, Luedeka, Fitch, Even & Tabin ATTYS.

INVENTOR
DELMAR RONALD JOHNSON

BY Anderson, Luedeka, Fitch, Even, & Tabin ATTYS.

United States Patent Office 3,439,850

Patented Apr. 22, 1969

3,439,850

TAPE HANDLING METHOD AND APPARATUS

Delmar Ronald Johnson, Des Plaines, Ill., assignor to Ampex Corporation, Redwood City, Calif., a corporation of California Filed Jan. 3, 1967, Ser. No. 606,976
Int. Cl. B65h 17/12, 23/08
U.S. Cl. 226—1 11 Claims

ABSTRACT OF THE DISCLOSURE

A tape handling apparatus and method is provided for a tape transducing system of the friction drive type. A cylindrical capstan engages the tape solely by tape tension which produces frictional forces between the respective surfaces of the capstan and the tape. The capstan has two axially displaced cylindrical surfaces of different diameters, each with high coefficients of friction with respect to the tape. The tape is wrapped partially around only the smaller diameter surface to produce a substantial area of contact solely with such surface at the beginning of the transducing loop and partially around only the other surface to produce another substantial area of contact solely with the other surface at the end of the transducing loop. Due to the different diameters of the two capstan surfaces a greater tangential velocity is produced at the second surface which is imparted by friction to the tape, thus preventing accumulation of the tape in the transducing loop.

This invention relates generally to methods of and apparatus for handling magnetic tape in magnetic tape transducing systems and, more particularly, to an improved method and apparatus for regulating the movement of the tape past transducing heads wtih a stepped capstan.

Tape handling apparatus and methods in magnetic tape recording and reproducing systems are designed to coordinate the operations of supplying tape from a supply reel, the tape comprising a flexible base or carrier with a magnetic record medium bonded to the base, feeding the tape from the supply reel past a transducing station or stations, and then accumulating the tape on a take-up reel after it has passed the transducing station. In such operations, the tape is directed from the supply reel, over a series of guides and past the transducing station or stations, where signals are transduced onto or from the record medium, and finally onto the take-up reel.

The movement of the tape past the transducing station is regulated by a capstan type tape drive means wherein the tape is engaged by the surface of a cylinder rotating about its axis. The supply and take-up reels are braked and driven, respectively, to maintain appropriate tension in the tape in the supply and take-up runs between the drive means and the respective reels. Generally, the tape tension is increased along the tape path from the supply reel to the take-up reel.

An important function of a tape handling system is to move the record medium at a substantially constant speed past the transducing stations. Failure to perform this function properly will result in frequency distortions such as flutter. Because the base or carrier of a tape is more or less elastic so that it is stretched longitudinally or elongated by tension applied to the tape and contracts to its original length when the tension is released, variations in tape tension at a transducing head will cause changes in the stretch of the tape base at that point. Since the record medium is bonded to the base, the effective speed of the record medium past the head will also be varied by such changes in tension. Therefore, it is important that the tension in the tape at the transducing head be maintained at a desired value for the speed of the record medium relative to the head to remain constant at that point.

An obstacle to maintaining a desired tension at the transducing head is the fluctuation in tape tension arising from such factors as irregularities in braking and clutching mechanisms in the tape driving system and electrostatic forces which cause adjacent layers of tape on the reels to stick to one another. One approach to overcoming such problems has been to provide a capstan which engages the tape both before and after it reaches the transducing station. This tends to isolate the transducing region from the rest of the tape path, so that fluctuations in tape tensions in other portions of the tape path do not extend into the transducing region. Recorders utilizing such an approach are referred to as being of the isolated loop type. It is important to note, however, that only short term or transient fluctuations in the tension in the supply run are isolated from the transducing region. Thus the general level of tape tension within the transducing region can be controlled by varying the steady state supply run tension. The isolating effect of the capstan is increased as the areas of engagement of the tape and capstan are increased. In such recorders it has been found advantageous to provide a dual wrap or single cylinder capstan where the tape is wrapped on and engages a first portion of a single capstan cylinder before and a second portion of the cylinder after passing the transducing station. Such a recorder is referred to as being of the "closed loop" type since, when the tape is viewed edgewise, it appears to form a closed loop. The present invention has particular application to such closed loop systems.

The present invention more specifically relates to a so-called friction drive system as distinguished from a pressure roll drive utilizing non-deformable metal capstan cylinders in conjunction with pressure rolls made of deformable materials which engage the tape and capstan cylinder to supply traction to the tape. In a friction drive system a surface having a relatively high coefficient of friction with respect to the tape is provided for the capstan cylinder and the tape is engaged by the friction force between the tape and the capstan surface without use of pressure rolls. Usually the capstan surface is of a deformable material such as rubber. Such systems do not require the high pressures against the tape or the additional mechanism associated with pressure rolls. In such friction drive systems, the tensions in the tape in the transducing loop are not completely independent of the tensions outside of the transducing loop but vary with variations in the tape tension between the capstan and the supply reel. Furthermore, short term or transient fluctuations in tape tension in the supply run can enter the transducing loop, although these effects are minimized by increasing the first area of engagement of the tape and drive means at the beginning of the transducing loop. Various servo means have been provided, therefore, to regulate the tensions outside the transducing loop so that the desired steady state tension in the transducing loop can be controlled. A typical servo system for this purpose is described herein, but the invention is not limited to utilization with such a system.

Another important function of a tape handling system is to insure smooth movement of the tape throughout its path between the supply and take-up reels. Failure to perform this function can cause serious problems of frequency distortion such as flutter and, in a video tape recorder, problems of signal synchronization.

In a friction drive system this problem is particularly acute where a negative tension differential exists across the first area of contact of the tape and capstan surface at the beginning of the transducing loop. Such a negative tension differential exists when the supply tape tension as the tape first engages the capstan at its entrance side is greater than its exit tension as it first disengages from the capstan at the exit side of the first area of tape-capstan contact. As a result of this decrease in tension across the first contact area, the net tension force on the tape at the first contact area is backward along the tape path toward the supply reel. Hence the tape will slip backward along its path unless the tension decrease is offset by the forward forces exerted by the capstan on the tape. The forward forces exerted by the capstan in a friction drive system are the frictional forces exerted between the tape and capstan surfaces which are moving forward.

Preferably, therefore, to eliminate slippage it would be desirable that the supply tape tension as the tape first engages the capstan be maintained in balance with the tape tension as it exits from the first area of tape capstan contact. In practice, however, only an approximate balance or equality between the two tensions can ordinarily be achieved and the exit tension is less than the supply run tension. When approximate balance is achieved transient or short term fluctuations in tape tension in the supply run are more effectively isolated from the transducing loop than when there is gross imbalance and incipient slippage. The isolation is not complete or steady state adjustments in the general level of tension could not be made; however, the isolation acts to filter out short term variations in tape tension as the tape enters the transducing loop. At the same time the substantial equalization of the supply and exit tensions results in the primary function of the capstan being that of metering or regulating the movement of the tape rather than of driving the tape or performing work on it. This means that a relatively large portion of the frictional force between the capstan surface and the tape is available for filtering out transient tape tension fluctuations since a relatively small portion is utilized to perform work on the tape.

Maintaining such frictional forces requires the tape to be held in contact with the capstan surface over an extended area by radial forces normal to the tape surface, since the friction force exerted between the drive and the tape are proportional to such normal forces and to the area of engagement. These radial forces and the area of engagement depend upon the configuration of the tape path and the tension in the tape. If the tape tension is too low or the first area of wrap of the tape around the capstan is too little, the friction forces will not be great enough to overcome any negative tension differential and permit the tape to be engaged by the capstan. Low exit tension at the beginning of the loop thus can have a doubly adverse effect on operation of the system by causing a net backward tension force on the tape and by decreasing the friction forces exerted by the capstan. Hence, too great a negative tension differential across the first contact area combined with low exit tension results in increasing slippage of the tape relative to the capstan surface and in decreasing isolation of the transducing loop from supply run tension variations.

Relatively low exit tension at the beginning of a closed transducing loop is in part occasioned by the fact that the tension in the portion of the tape in the transducing loop must increase along the tape path from the beginning of the transducing loop to the end of the loop due to the friction forces exerted on the tape by the various guides, heads and pressure pads in the transducing loop itself. Therefore, the point in the transducing loop where the tension is least is at the exit of the first area of tape-capstan contact and the point where the tension is greatest is at the end of the transducing loop where the tape engages the capstan for the second time. Since the tape is elastic, these different tensions cause the tape to be more elongated at the second contact area than at the first contact area. This elongation results from a concomitant reduction in cross section of the tape.

The rate at which the mass of the tape is moved is proportional to the product of the tape cross section, the density of the tape, and the linear speed of the tape. For conventional tapes, the density is substantially constant. With the conventional single cylinder capstan the tape is driven at the same linear speed at both the first and second tape-capstan contact areas. Where the cross section of the tape is more at the first contact area, for each mass unit of relatively unstretched tape driven into the transducing loop in a given period of time, less than one mass unit of relatively stretched tape is driven out of the loop. Because in conventional dual wrap capstan systems, this extra mass of tape is not driven out of the transducing loop, tape will accumulate in the loop. This accumulation of tape in the transducing loop will cause the tension at all points in the loop, including the tension at the exit of the first area of contact, to decrease. If the tension at this point is reduced too much, as previously noted, the tape will slip.

An additional adverse effect caused by the negative tension differential combined with low exit tension at the first contact area is that the area of firm frictional engagement of the tape and drive is reduced. Since isolation of the transducing loop from transient tape tension fluctuations in the supply run is dependent upon maintaining the integrity of this area, the reduction of area of engagement reduces isolaiton of the transducing loop. Hence, disturbances in tape tension can enter the transducing loop more easily.

An important feature of the present invention is to provide a method and apparatus for eliminating slippage of tape at the supply drive of a closed transducing loop, friction driven magnetic tape transducer and maximizing the isolation of the transducing loop from external fluctuations in tape tension, thereby providing for smooth movement of the tape in the transducing loop and constant tension at the transducing head. This is accomplished by driving the tape out of the loop at a faster linear rate than it is driven into the loop, using a suitable stepped capstan.

It is, therefore, a primary object of the present invention to provide an improved tape handling method and apparatus in which the tape in the transducing loop is isolated from and less susceptible to influence by external tension fluctuations.

Another object is to provide a tape handling method and apparatus which maintains a desired tape tension at a transducing head and concomitantly maintains a smooth tape movement in the transducing loop of the tape of a magnetic tape recorder of the closed transducing loop friction drive type.

Yet another object of the invention is to provide a method and apparatus for improving the isolation of the transducing loop in such a system from transient fluctuations in tape tension in the supply run.

A further object of the invention is to provide a method and apparatus for eliminating tape accumulation in the transducing loop of such a system.

Yet another object of the invention is to provide a method and apparatus for eliminating tape slippage at the beginning of the transducing loop in such as system by proper tensioning of the tape at the exit of the first tape-capstan contact area.

Still another object of the invention is to provide a method and apparatus for balancing tape tension across the first tape-capstan contact area.

A still further object of the invention is to provide an improved capstan construction with which tape movement can be more easily regulated.

Other objects and advantages of the invention will become apparent from the following description when taken in connection with the accompanying drawings in which.

Figure 1:
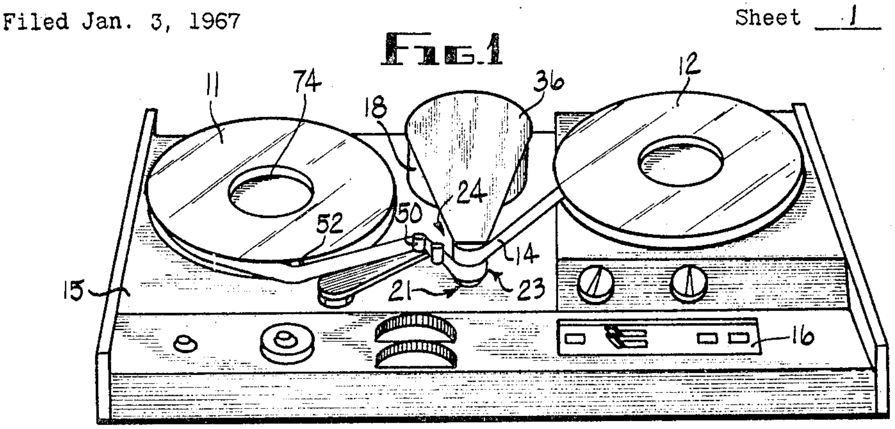
FIGURE 1 is a perspective view of a magnetic tape recording and reproducing system incorporating the present invention.

Referring now more particularly to the drawings, a video tape recording system and a tape handling apparatus therefor is shown. The recording system shown herein and the complete handling apparatus shown are not the only types which could incorporate the invention and are shown for the purpose of complete disclosure of the invention in a typical environment.

The tape handling apparatus includes supply and take-up reels 11 and 12 mounted for rotation about axes perpendicular to a deck 13 at spaced positions thereon and serving to store the magnetic tape 14. As may be seen in FIGURE 1, the deck 13 is covered by a panel 15 with appropriate openings for the guides and other elements to be subsequently described. A control panel 16 is mounted over the front part of deck 13 for supporting the mechanical and electrical controls of the apparatus. The supply reel 11 is mounted on the deck 13 adjacent the panel 15 while the take-up reel 12 is mounted on the deck 13 above the panel 15, so as to be elevated with respect to the supply reel for purposes subsequently described. The supply and take-up reels may be coupled in a suitable manner to separate electric drive motors or to a single motor driving system (neither of which is shown).

The length of tape 14 extending between the reels 11 and 12 is wrapped helically about a transducing assembly 18. The transducing assembly has a generally cylindrical outer surface and may include a rotating transducing head 19 for engaging the tape as it passes helically around the outer surface of the transducing assembly 18. The transducing head operates to record information on the tape or to reproduce electrical signals from information already recorded on the tape.

In order to facilitate driving, metering and guidance of the tape helically about the transducing assembly, a rotatable cylindrical capstan 21 is mounted upon the deck 13 in forwardly spaced parallel relation to the cylindrical transducing assembly 18. The capstan 21 is of the dual wrap type. The tape 14 is wrapped on the capstan 21 both before and after it passes by the transducing assembly 18. The capstan 21 has a covering 22 made of rubber or rubber-like material which is deformable and provides a high coefficient of friction for engaging the tape 14. The tape 14 wraps around the capstan 21 yearly 180° both before and after it passes the transducing assembly 18. The tension in the tape 14, together with the high coefficient of friction of the capstan surface with respect to the tape and the area of wrap of the tape around the capstan permits the capstan 21 to firmly engage the tape 14. The dual wrap capstan 21 thus provides a first area of tape-capstan contact 23 and a second area of tape-capstan contact 24. It may be seen that the tape path may be said to comprise a transducing loop 25 which is of the closed type, a supply run 26, and a take-up run 27.

Figure 2:
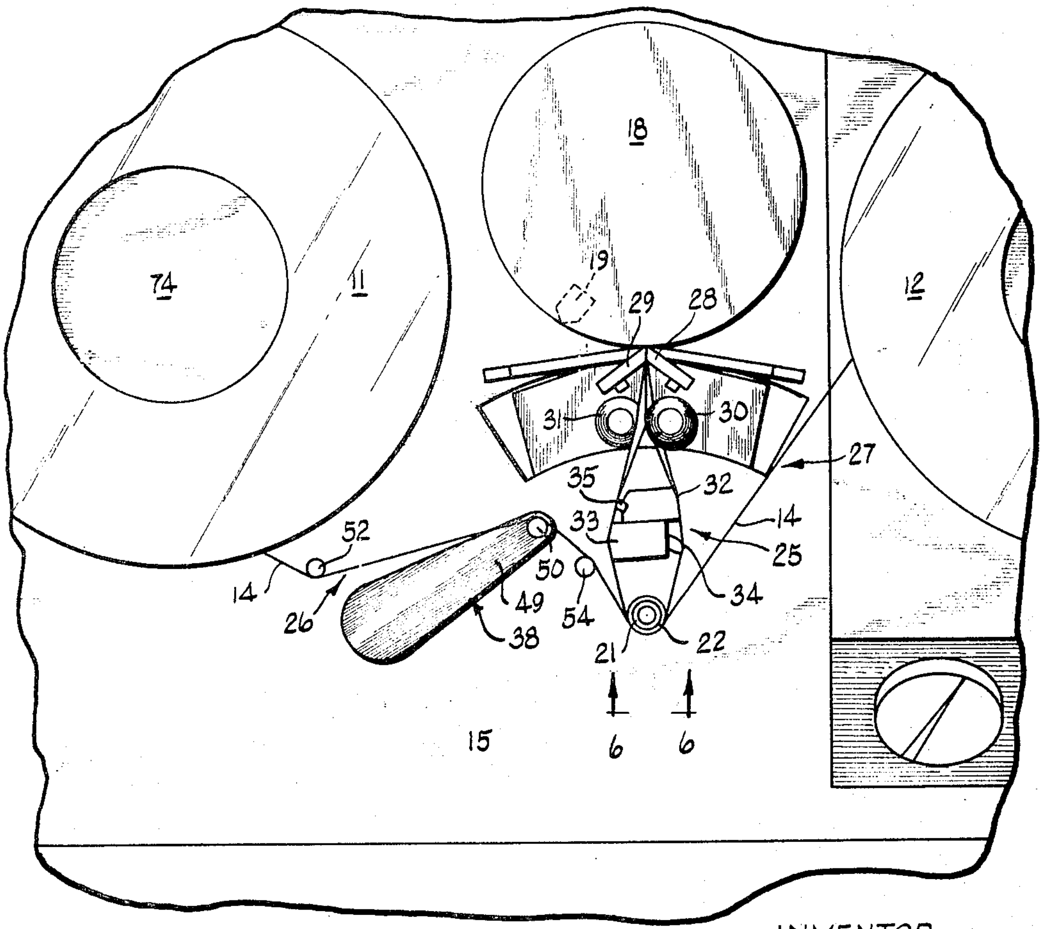
FIGURE 2 is a plan view of the tape handling apparatus of the system of FIGURE 1 with the cover panel removed from the transducing drive assembly.

As shown in FIGURE 2, uniformly cylindrical entrance and exit guide posts 28 and 29 are mounted upon the deck close to the periphery of the transducing assembly 18 and on opposite sides of a line between the transducing assembly axis and the capstan axis. The posts are parallel to the axis of the transducing assembly 18. In addition, a pair of spindles 30 and 31 are mounted upon the deck 13 on opposite sides of the line between the capstan axis and the transducing assembly axis at points between capstan 21 and the posts 28 and 29. The tape 14 leaving the supply reel 11 extends around the lower portion of the capstan 21, that is, about the first contact area 23, about the downwardly tapered lower half of spindle 30, between posts 28 and 29, around the entrance post 28 and tangentially onto the lower portion of the surface of the transducing assembly 18.

By virtue of the shape of spindle 30, the tape is twisted slightly to slant the upper edge thereof inwardly toward the line between the capstan axis and the transducing assembly axis. This twist causes the tape entering the transducing assembly 18 to follow a rising path as it extends substantially 360° around the transducing assembly to the exit post 29. The tape thus extends about the transducing assembly in a helical wrap. The taper of the spindle 30 is, moreover, preferably selected to impart a pitch to the helical wrap which advances the tape vertically by substantially one entire width of the tape in passing around the transducing assembly 18 to a point adjacent the exit post 29. The tape then tangentially leaves the assembly 18 to extend around the exit post 29 and between the posts 28 and 29.

The departing tape extends around the upwardly tapered upper half of spindle 31 and around the upper portion of the capstan 21, that is, the second area of contact 24, onto the take-up reel 12. A twist is applied to the tape as it extends about the upper half of spindle 31. The taper of the upper half of this spindle is equal but opposite to that of the lower half of the spindle 30 so that the tape is twisted to slant its upper edge outwardly from a line between the transducing assembly axis and the capstan axis by an amount equal to the inward slant of the upper edge arising from the original twist which effects the helical wrap around the transducing assembly 18. Thus, the tape departing from the assembly is returned to a path parallel to the deck 13 before it reaches the capstan 21 so that the tape 14 extends uniformly thereabout and is directed tangentially upon the take-up reel 12 without wrinkling or twisting. As previously noted, by virtue of the helical wrap the tape rises in passing around the transducing assembly 18, and it is for this reason that the take-up reel is mounted in elevated position above the panel 15.

As part of the illustrated transducing assembly 18, a pair of transducing heads 32 and 33 are provided to engage the tape between the capstan and the spindles 30 and 31 as it approaches the transducing assembly 18, and as it leaves, respectively. A pair of guides 34 and 35 are provided adjacent the transducing heads 32 and 33 to cooperate therewith in providing the proper tape path between the capstan 21 and the spindles 30 and 31. As shown in FIGURE 1, the transducing assembly 18, the capstan 21, and all of the elements disposed therebetween may be covered by a decorative and protective panel 36. In FIGURE 2, the appartus is shown with the panel 36 removed.

As previously noted, an extremely important requirement for magnetic tape handling apparatus and especially such apparatus forming part of a closed loop magnetic tape recording or reproducing system is that the tension of the tape at the transducing heads be carefully controlled at all times. For example, the accuracy of the timing information of a video signal on the tape is dependent upon maintaining accurate and stable record medium speed and tape dimensions. A known device for controlling the general level of tape tension is a mechanical tape tension servo brake on the supply reel. Such a device is generally used to resist the withdrawal of tape 14 from the supply reel 11 by the capstan 21 in order to place the tape in the supply run 26 under tension.

In mechanical tape tension servo brakes, the tension of the tape is sensed by a lever in contact with the tape. Some systems of this type have linked the arm or lever directly to a brake band which engages the periphery of a brake drum coupled to the supply reel. The tape passes over a guide on the lever, and a variation in tape tension produces a change in the force exerted on the guide by the tape. This change in force produces a change in the moment on the lever produced by tape tension forces, and this change in moment is translated by the lever into a corresponding change in the force on the brake band to effect a change in the drag or resistance to rotation placed upon the supply reel by the brake drum. The mechanical advantage of the forces applied to the lever by the tape tension over the forces applied to the brake band by the lever determine the gain in the mechanical feedback from the tape to the brake.

In the illustrated tape handling apparatus such a lever 38 is mounted on the deck 13 for rotation in a plane parallel to the deck about an axis or fulcrum 47. The lever 38 includes a lever arm 49. At the free end of the lever arm 49 is a guide 50. The lever 38 is mounted so that the guide 50 engages the tape on the supply run 26 between the supply reel 11 and the capstan 21. In order for the tape to be properly guided over the guide 50 and to provide a fixed amount of tape wrap about the guide 50, a guide 52 is mounted on the deck 13 between the guide 50 and the supply reel 11. Another guide 54 is mounted on the deck 13 between the guide 50 and the capstan 21. The guides 52 and 54 not only guide the tape in a horizontal plane in the proper tape path, but also guide the tape vertically to hold it in the same horizontal plane as it passes from the supply reel 11 to the capstan 21.

The guide 54 is disposed relative to the guide 50 and the lever 38 so that the tape 14 passing between the guides 50 and 54 moves in a direction substantially normal to the lever arm 49. As shown in FIGURE 2, the guide 54 is positioned outside the arc of lever arm 49 to permit the lever arm 49 to swing inside the guide 54 when it is desired to move the lever 38 out of operating position. At each guide it is preferable that the tape wrap at least 15° thereabout in order to permit the guide to provide a positive guiding action. At the same time the wrap is kept relatively small to keep friction low.

The tape path from the guide 52 to the guide 50 is preferably, as shown, along a line generally in the direction of the lever arm 49. The force exerted by the tape as it reaches the guide 50 is generally toward the axis 47 and hence does not place much torque upon the lever 38. The force produced by the tension in the tape as it leaves the guide 50 is substantially normal to the lever arm 49 and hence produces a torque substantially equal to the tension in the tape times the length of the lever arm 49 between the axis 47 and the outer extremity of the guide 50. The torque on the lever 38 about the axis 47 that is producd by the tape tension is therefore dependent upon tape tension, and may be used as a direct measure of tape tension.

Figures 3, 4, 5, 6:
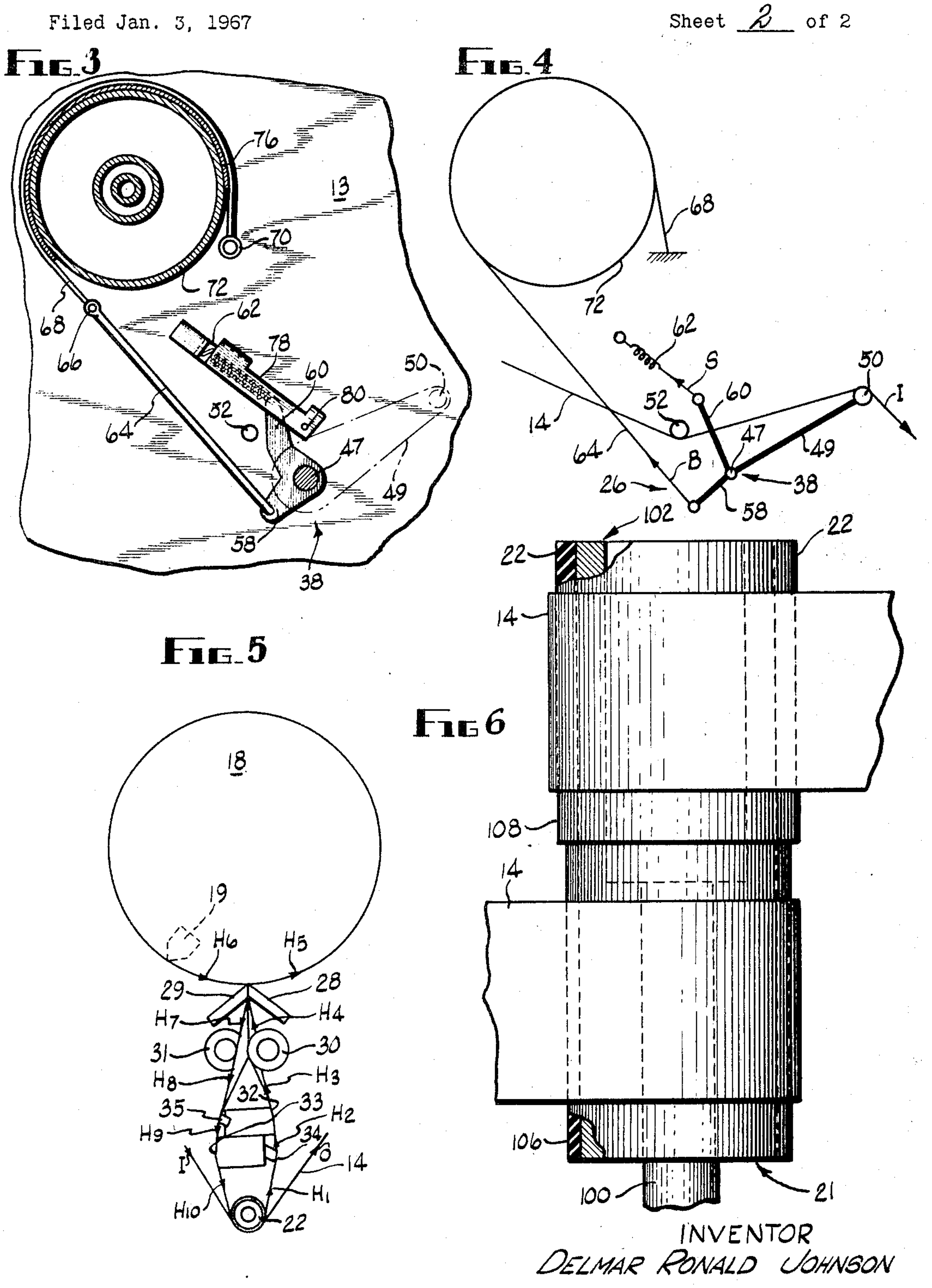
FIGURE 3 is a sectional view of a portion of the apparatus shown in FIGURE 2 taken just below the cover plate with certain parts shown in phantom.
FIGURE 4 is a force diagram illustrating certain of the force acting upon the tape tension control mechanism shown in FIGURE 3.
FIGURE 5 is a force diagram illustrating certain of the forces acting on the tape in the transducing loop and on both sides of the capstan.
FIGURE 6 is an enlarged partially broken away view of the capstan taken in the direction of the arrows 6—6 of FIGURE 2.

The operation of the lever 38 as part of a servo system is best illustrated in FIGURE 3. Although the apparatus is shown as a section taken below the cover panel 15, the lever arm 49 and the guide 50 are shown in phantom to illustrate the operating relationships. As shown in FIGURE 3, the lever 38 also comprises two lever arms 58 and 60 also mounted for rotation in a plane parallel to the deck 13 about the axis 47. The lever arm 60 is connnected to a biasing spring 62 which is mounted to provide a reference torque to the lever arm 60 in a direction opposite to the torque produced by the tape tension.

The lever arm 58 is connected to a rod 64 which in turn is connected by a coupling 66 to one end of a brake band 68. The other end of the brake band 68 is fastened to a pin 70 mounted on the deck 13. The brake band 68 passes over a brake drum 72 which is rigidly coupled to a turntable 74 on which the supply reel 11 is mounted. Between the brake band 68 and the brake drum 72 is a pad 76 which may be made of felt and which acts to provide the appropriate friction surface for the brake. The brake drum 72 may be made of plastic. The pad 76 is secured to the brake band 68 which may be steel.

The forces on the lever arms produce the servo action. With the biasing spring mounted in the position indicated, a counter-clockwise reference torque is produced by the spring force S, a clockwise torque is produced by the supply run or input tape tension I at the guide 50, and a clockwise torque is also produced by the brake band tension B. FIGURE 4 is a force diagram illustrating the action of these forces on the lever 38. These torques are necessarily in equilibrium else the lever 38 would rotate. Of course, some small rotation may occur, but this is immediately resisted by the spring 62 if the lever rotates clockwise, or by the brake band 68 if the lever rotates counter clockwise. Expressed mathematically:

$$T_S+T_I+T_B=0$$

where:

$T_S$ is the torque exerted by the biasing spring 62;
$T_I$ is the torque exerted by the supply run tape tension at the guide 50; and
$T_B$ is the torque exerted by the brake band 68.

Since the reference torque produced by the biasing spring 62 remains constant (unless adjusted), an increase in tape tension reduces the torque exerted by the brake band by relieving the tension in the brake band. Relieving the tension in the brake band in turn reduces the friction forces between the brake band 68 and the brake drum 72, thus permitting the turntable 74 and hence the supply reel 11 to rotate more freely. This reduces the force holding back the tape 14 which, in turn, reduces the supply run tape tension I. This closes the servo loop and acts to control the tape tension at the guide 50.

As is evident from the above equation, the reference torque $T_S$ is equal and opposite to the sum of the tape tension torque $T_I$ and the brake band torque $T_B$. How the torques are divided between the brake band torque $T_B$ and the tape tension torque $T_I$ depends, among other things, upon the relative lengths of the lever arms 49 and 58. The control point for the tape tension I is therefore determined by the tension in the biasing spring 62 and the length of its moment arm. It is generally desirable that adjustment of tape tension be possible, at least in the reproducing operation. To this end, the biasing spring 62 is mounted in such a way as to provide for adjustment in the torque $T_S$.

As described above, the measured supply run tape tension I is used to operate the servo system to control the tape tension. However, it is the level of the tape tension in the transducing loop 25 that the servo system is intended to keep relatively constant.

Tape tension must increase between the exit of the first area of tape capstan contact 23 and the entrance of the second area of tape capstan contact 24. Friction forces are exerted on the tape by various structures in the transducing assembly 18. Structures in the illustrated recorder which exert such forces include the surface of the transducing assembly 18, guide posts 28 and 29, spindles 30 and 31, guides 34 and 35 and transducing heads 32, 33, and 19. These friction forces will prevent the tape from moving along its path unless they are overcome by an increase in tape tension over the transducing loop.

The tape between the exit of the first contact area 23 and the first structure in the transducing loop 25 may have a tension, say $H_1$. In order to move the tape 14 past the first structure in its path an additional amount of force is required to overcome the friction force exerted by the first structure, which as illustrated is the guide 34. Hence, the tape beyond the guide 34 will have a higher tension $H_2$. Assuming the tape is not accelerated at this point the quantity $(H_2-H_1)$ will equal the friction force exerted by the guide 34 on the tape. Similarly, the tension in the tape will increase as it passes each structure in the transducing loop which exerts friction force on the tape. Thus, as shown in FIGURE 5, the tension in the transducing loop will have different values at different points which are designated in increasing order of magnitude of $H_1$ through $H_{10}$. The output tape tension in the take-up run is indicated as O.

As a result of the increasing tension in the tape around the loop 25 the tape 14 is deformed and, more specifically, linearly stretched as it travels along the transducing loop 25. This will cause a concomitant reduction in the cross sectional area of the tape as the tape travels around the loop. The rate at which a mass of tape moves past a point on the tape path is the product of its cross sectional area, its density and its linear speed at the point. Since the tape moves at the same speed as the capstan surface when engaged by the surface at each area of tape capstan contact, a conventional single capstan drive which moves the tape at a single linear speed at both of the surfaces of contact with the tape will drive a larger mass of tape into the transducing loop than it will drive out of the loop. Hence, a mass of tape will gradually collect in the loop. This causes the tension in the tape at all points in the loop to decrease gradually.

This decrease in tension at all points in the loop can be troublesome wherever it occurs as, for example, at the transducing heads where it may prevent the desired close contact of the head and tape and cause a decrease in the effective speed of the record medium past the head, the latter effect resulting in frequency deviation. The decrease in the tension $H_1$ at the exit of the first contact area 23 is a most important effect. As this tension decreases the normal or radial forces the tape and capstan exert on each other are also decreased. If a sufficiently low value is reached for these forces, the frictional force between the tape and capstan will become so low that the tape will slip relative to the capstan. Since the exit tension $H_1$ at the first contact area 23 is usually less than the input tension I and there is almost always some slipping beginning at the exit end of the first contact area between the tape and capstan. This slipping extends backward along the tape path so as to relieve any tension differentials along the path exceeding those supportable by the friction forces. As the exit tension $H_1$ decreases, the area of slippage increases until ultimately the capstan and tape may be firmly engaged over only such a small area that the capstan will cease to meter the tape. Even if this point is not reached, the reduction in the area over which the capstan firmly exerts force on the tape facilitates the entry into the transducing loop of transient fluctuations in tape tension which occur in the supply run. Preferably the tape tensions at each end of the first contact area are maintained at substantially equal values so that the capstan can serve primarily to meter the tape movement rather than drive the tape. Achieving this goal leads to the result that the capstan performs little work on the tape and uniform motion of the capstan without slippage relative to its driving motor is facilitated.

It has been found that avoidance of these undesirable results while maintaining relatively equal tape tensions on each side of each capstan drive area can be achieved by removing the tape from the transducing loop at a greater linear rate than it is driven into the loop. This may be achieved by the method of driving the capstan surface and tape at a first predetermined speed at the first contact area and at a second and greater predetermined speed at the second contact area, the two speeds being so related that tape does not accumulate in the transducing loop. For achieving this result an improved dual wrap capstan is provided wherein the linear speed of the capstan surface and tape leaving the transducing loop is greater than the linear speed of the capstan surface and tape entering the transducing loop. In a dual wrap capstan where both the supply and take-up drive means are mounted on the same rotating shaft, this is achieved by making the diameter of the take-up drive means suitably greater than the diameter of the supply drive means. Such an improved capstan is illustrated in detail in FIGURE 6. It should be noted that, as shown in FIGURE 6, the horizontal dimensions of the capstan surfaces are increased relative to the vertical dimension for clarity.

The improved capstan 21 is secured to a vertical shaft 100 extending through the deck 13 and rotatably mounted in a bearing (not shown) secured to the deck 13. The shaft 100 drives the capstan 21 and in turn is driven by suitable motive means (not shown) mounted below the deck 13 which may include conventional provisions for maintaining relatively constant angular velocity of the shaft, such as a flywheel. The upper end of the shaft 100 is rigidly secured, as by welding in a recess in the lower end of an elongated, cylindrical hub 102 which is hollow at its upper end. Both the shaft and hub are desiraby of a rigid and strong material such as steel which will withstand the forces applied to them by high speed operation of the recorder.

Bonded to the cylindrical outer surface of the hub is the covering layer 22 made of a deformable material such as rubber which provides a high coefficient of friction to engage and thereby drive the tape 14. The layer 22 comprises a lower portion 106, the outer surface of which engages the tape as it enters the transducing loop 25, and an upper portion 108, the outer surface of which engages the tape as it leaves the transducing loop 25. The vertical dimension of each portion is greater than the width of the tape. The lower portion 106 of the layer 22 thus includes the previously mentioned first area of contact 23 and the upper portion includes the second area of contact 24.

The lower portion 106 is so fabricated as to be thinner in cross section than the upper portion 108 so that the capstan diameter through the upper portion 108 is less than the capstan diameter through the lower poriton 106. The diameters of the lower and upper parts of the capstan through the upper and lower portions of the layer 22 may be designated as $d_1$ and $d_2$, respectively. Since both parts of the capstan are driven by the same shaft, their angular velocity $\omega$ is the same. However, since their diameters differ, the tangential velocity of points on their surfaces and hence the linear speed of the respective portions of the tape engaged by them differ. As a result, linear units of tape 14 are driven out of the transducing loop 25 by the upper portion 108 faster than they are driven into the loop by the lower portion 106. The predetermined speed difference is such that the stretch of the tape in the transducing loop 25 caused by increase in tape tension over the loop is offset, and no tape accumulates in the loop. Specifically, the linear speed $V_1$ of the tape 14 entering the transducing loop will equal $\omega d_1/2$, while the linear speed $V_2$ of the tape leaving the loop will be $\omega d_2/2$. Hence, the ratio of tape speed leaving the loop to that entering the loop will be $d_2/d_1$.

The condition which must be met for perfectly smooth movement of the tape through the transducing loop 25 without accumulating tape 14 therein is that for each mass of tape entering the loop in a unit of time, an equal mass of tape be removed in the same time. Expressed mathematically, $$\left[\frac{dm}{dt}\right]_{in}=\left[\frac{dm}{dt}\right]_{out}$$

where $m$ is the mass of the tape, and $t$ is time.

Since tape mass is the product of density $\rho$, cross sectional area A and length $l$ $$\frac{dm}{dt}=\frac{d}{dt}(\rho Al)$$

As a first approximation density remains constant throughout the tape path and cross sectional area may be considered constant at each point considered. Hence, $$\rho A_{in}\left[\frac{dl}{dt}\right]_{in}=\rho A_{out}\left[\frac{dl}{dt}\right]_{out}$$

But $$[dl/dt]_{in}=V_1$$

and $$[dl/dt]_{out}=V_2$$

Therefore $$A_{in}/A_{out}=V_2/V_1=d_2/d_1$$

The minimum value of this ratio which will be effective in practice to eliminate the accumulation of tape depends upon the elastic properties of the tape and the range of tensions which are encountered in a particular tape path and may best be determined empirically. Since the capstan surface layer is itself compressible, in determining the exact diameters one should consider the compressing effect on the surface layer of the capstan of the pressure which is exerted on it by the tape in operation. If high operating pressures are anticipated, the diameters should be made larger. At the same time, the practical maximum value is determined by the wear of the tape and the desired effective tape life. The limiting factor in a video tape recorder is often still frame operation, where the tape is held stationary at the transducer to play back the same video picture repetitively. At high tensions the rotating transducing head 19 quickly wears the tape. The ultimate upper limit on the ratio is, of course, dependent on the maximum tension which the tape can withstand without exceeding its elastic limit.

In a typical video tape recorder constructed according to the invention and utilizing tape one inch wide and one mil thick, a constant torque take-up drive produces an output tension O varying between 10 oz. and 20 oz. and a brake and servo system maintains the input tension I relatively constant at about 5 oz. to 10 oz. The diameter $d_2$ of the capstan 21 at the layer 22 is approximately 0.75 inch. The ratio $d_2/d_1$ is 1.001. Hence, if $d_2$ is exactly .75 inch, $d_1$ will be .7492 inch. This causes the exit tension $H_1$ to be about 6 oz., and $H_1$ and I are approximately equal. The tension $H_6$ at the transducing head 19 is about 10 oz. The tension $H_{10}$ between the head 33 and the second contact area 24 is about 18 oz. so that $H_{10}$ and O are approximately equal. The desired difference in the thickness of the two portions 106 and 108 of the layer 22 may be readily achieved by molding a cylindrical surface of uniform diameter and machining the lower portion 106.

It may be seen that the above described invention provides a simplified method and apparatus for preventing the accumulation of tape and slippage of tape in a closed transducing loop in a friction drive magnetic transducing system. In addition, the method and apparatus contributes to effective isolation of the transducing loop from external transient fluctuations in tape tension and aids in maintaining constant record medium speed at a transducing head.

Various changes and modifications may be made in the above described method and apparatus, all of which would fall within the spirit and scope of the invention. For example, the general level of tension in the supply run 26 might be maintained at a constant value by the servo system, and the various structures in the transducing loop might be differently arranged. Furthermore, the various tensions in the transducing loop and the supply and take-up runs could be greater or less than in the specific example. In addition, the invention is applicable to all sizes and types of magnetic tape. Various features of the invention are set forth in the accompanying claims.

I claim:

1. Tape handling apparatus for a magnetic tape transducing system of the closed transducing loop, friction drive type, wherein an elastic magnetic recording tape follows a tape path comprising successively a supply run, a transducing loop wherein forces opposing the movement of said tape along said tape path result in an increase of tension in and stretching of said tape as it moves along said transducing loop, a transducing station being positioned on said transducing loop, and a take-up run, said apparatus comprising a cylindrical capstan for engaging said tape solely by reason of tape tension which produces frictional forces between the surface thereof and said tape, said capstan having first and second coaxial cylindrical surfaces axially displaced from each other, said first cylindrical surface being of lesser diameter than said second cylindrical surface, said first and second cylindrical surfaces having high coefficients of friction with respect to said tape, tape guide means for wrapping said tape partially around said capstan and adjacent only said first cylindrical surface of said capstan to produce a first substantial area of contact of said tape solely with said first cylindrical surface at the beginning of said transducing loop and for wrapping said tape partially around said capstan and adjacent only said second cylindrical surface of said capstan to produce a second substantial area of contact of said tape solely with said second cylindrical surface at the end of said transducing loop, supply tension means and take-up tension means for providing tension in said tape in said supply run and take-up run, respectively, thereby urging said tape into frictional engagement with said capstan in the respective areas of contact, and means for rotating said capstan about its axis to produce friction forces between the tape and said cylindrical surfaces and move the tape in contact with said cylindrical surfaces whereby the different diameters of said first and second cylindrical surfaces produce a greater tangential velocity of said tape at said second surface than at said first surface so as to prevent accumulation of tape in said transducing loop.

2. Tape handling apparatus according to claim 1 wherein the ratio of the diameter of said second cylindrical surface ($d_2$) to the diameter of said first cylindrical surface ($d_1$) is such that a substantial tension is produced in the tape at the exit of said first contact area, so as to provide an area of firm engagement of said tape and said first contact area whereby slipping of said tape relative to said first contact area is prevented.

3. Tape handling apparatus according to claim 2 wherein said tape guide means provides a sufficient first contact area that said area of firm engagement is of sufficient size to prevent transient fluctuations of tape tension in said supply run from entering said transducing loop.

4. Tape handling apparatus according to claim 1 wherein said supply tension means and said take-up tension means produces a substantially constant level of tension in said transducing loop whereby tape tension fluctuations in said transducing loop are minimized.

5. Tape handling apparatus according to claim 1 wherein the ratio of the diameter of said second cylindrical surface to the diameter of said first cylindrical surface is of the order of 1.001.

6. A method of handling tape in a magnetic tape transducing system of the closed transducing loop, friction drive type with a capstan for engaging said tape solely by reason of tape tension which produces frictional forces between the surface thereof and said tape, wherein an elastic magnetic recording tape follows a tape path comprising successively a supply run, a transducing loop wherein forces opposing the movement of said tape along said tape path result in an increase of tension in and stretching of said tape as it moves along said transducing loop, a transducing station being positioned on said transducing loop, and a take-up run, said method comprising wrapping said tape partially around said capstan and adjacent only a first cylindrical surface of said capstan having a high coefficient of friction with respect to said tape so as to produce a first substantial area of engagement of said tape solely with said first surface at the beginning of said transducing loop, wrapping said tape partially around said capstan and adjacent only a second generally cylindrical surface of said capstan having a high coefficient of friction with respect to said tape so as to produce a second substantial area of engagement of said tape with said second surface at the end of said transducing loop, said areas of engagement being axially displaced from each other, tensioning said tape in said supply and take-up runs, thereby urging said tape into frictional engagement with said capstan in the respective areas of contact, driving said first area of engagement at a first predetermined linear speed to produce a friction force on said tape moving said tape past said first area of engagement and driving said second area of engagement at a second predetermined linear speed to produce a friction force on said tape moving said tape past said second area of engagement, said second predetermined linear speed being greater than said first predetermined linear speed, whereby the linear velocity of said tape at the end of said transducing loop is greater than the linear velocity of said tape at the beginning of said transducing loop so as to prevent accumulation of tape in said transducing loop.

7. A method of handling tape according to claim 6 including making the tape tensions at the opposite sides of said first area of engagement approximately equal in steady state operation.

8. A method of handling tape according to claim 7 including making the tape tensions at the opposite sides of said second area of engagement approximately equal in steady state operation.

9. A method of handling tape according to claim 6 including metering the movement of the tape by regulating the linear speeds of said first and second areas of engagement.

10. A method of handling tape according to claim 6 including controlling the tension in said tape in said supply run to produce a substantially constant level of tension in said transducing loop.

11. A method of handling tape according to claim 6 wherein said tape is wrapped on said first surface to make said first area of engagement sufficient to prevent transient fluctuations in supply run tension from entering said transducing loop.

References Cited

UNITED STATES PATENTS 2,913,192 11/1959 Mullin ---------- 226—195 X
3,237,831 3/1966 Johnson ---------- 226—188 X
3,282,486 11/1966 De Moss.

ALLEN N. KNOWLES, *Primary Examiner.*
RICHARD A. SCHACHER, *Assistant Examiner.*

U.S. Cl. X.R.

226—168, 188, 190, 195